(12) United States Patent
Riggan et al.

(10) Patent No.: US 12,192,365 B2
(45) Date of Patent: Jan. 7, 2025

(54) GENERATING CRYPTOGRAPHIC PROOF OF A SERIES OF TRANSACTIONS

(71) Applicant: Marqeta, Inc., Oakland, CA (US)

(72) Inventors: Micah Riggan, Alpharetta, GA (US); Tamas Henning, Newark, CA (US); Grier Johnson, Monterey, CA (US)

(73) Assignee: Marqeta, Inc., Oakland, CA (US)

( * ) Notice: Subject to any disclaimer, the term of this patent is extended or adjusted under 35 U.S.C. 154(b) by 302 days.

(21) Appl. No.: 17/531,600

(22) Filed: Nov. 19, 2021

(65) Prior Publication Data

US 2023/0163970 A1    May 25, 2023

(51) Int. Cl.
*H04L 9/32* (2006.01)
(52) U.S. Cl.
CPC .......... *H04L 9/3218* (2013.01); *H04L 9/3236* (2013.01)
(58) Field of Classification Search
CPC ....... H04L 9/3218; H04L 9/3236; H04L 9/50; H04L 2209/56
See application file for complete search history.

(56) References Cited

U.S. PATENT DOCUMENTS

| | | | | |
|---|---|---|---|---|
| 11,182,366 B2 * | 11/2021 | Anderson | ........... | G06F 16/2365 |
| 11,444,777 B2 * | 9/2022 | Davis | ................ | G06Q 20/3827 |
| 11,875,400 B2 * | 1/2024 | Padmanabhan | ......... | G06F 16/27 |
| 11,876,910 B2 * | 1/2024 | Padmanabhan | ... | G06F 16/24573 |
| 2021/0194673 A1 * | 6/2021 | Collins | ................ | H04L 9/0643 |
| 2021/0232595 A1 * | 7/2021 | Solan | .................. | G06F 16/2246 |
| 2021/0326894 A1 * | 10/2021 | Senci | .................. | G06Q 20/389 |

FOREIGN PATENT DOCUMENTS

WO    WO 2019/178772    9/2019
WO    WO-2019178772 A1 *  9/2019

OTHER PUBLICATIONS

"International Search Report and Written Opinion issued in PCT Application No. PCT/US22/40580", Mailed Date: Mar. 13, 2023, 14 Pages. (088853.0128).

(Continued)

*Primary Examiner* — Han Yang
(74) *Attorney, Agent, or Firm* — Ray Quinney & Nebeker; James Bullough

(57) ABSTRACT

In one embodiment, a computer-implemented method includes, using a transaction processor of a first computer, receiving a request from a second computer to verify a first transaction ledger in comparison to a second transaction ledger. The method includes converting the first transaction ledger and the second transaction ledger to a normalized data format. The method includes executing one or more cryptographic one-way hash algorithms over the first transaction ledger and the second transaction ledger to create and store in memory a first hash tree for the first transaction ledger and a second hash tree for the second transaction ledger. The method includes forming and transmitting to the second computer a response to the request based on a comparison of the first hash tree and the second hash tree, the response including a notification of inconsistency between the first transaction ledger and the second transaction ledger or identified discrepancies and updates.

20 Claims, 6 Drawing Sheets

(56) References Cited

OTHER PUBLICATIONS

Eijdenberg, A., Laurie, B., Cutter, A. (2015). Verifiable Data Structures, available at https://github.com/google/trillian/blob/master/docs/papers/VerifiableDataStructures.pdf, 7 pages.
Chatzigiannis, P., Chalkias, K. (Jul. 22, 2021). Proof of Assets in the Diem Blockchain. In: , et al. Applied Cryptography and Network Security Workshops. ACNS 2021. Lecture Notes in Computer Science(), vol. 12809. Springer, Cham. https://doi.org/10.1007/978-3-030-81645-2_3, 15 pages.
Ji, Y., Chalkias, K. (Nov. 15, 2021). Generalized Proof of Liabilities. In: CCS '21. https://doi.org/10.1145/3460120.3484802 , 22 pages.
Chalkias, K., Lewi, K. Mohassel, P., Nikolaenko, V. (Oct. 11, 2021). Distributed Auditing Proofs of Liabilities. In: Cryptology ePrint Archive. Available at: https://eprint.iacr.org/2020/468, 57 pages.

\* cited by examiner

GENERATING CRYPTOGRAPHIC PROOF OF A SERIES OF TRANSACTIONS

TECHNICAL FIELD

One technical field of the present disclosure is computers programmed to execute high-speed, high-volume transaction protocols and messaging. Another technical field is computer-implemented verification of data transactions, particularly transactions that are represented in digitally stored, specialized data structures, at high speed in high-volume transaction protocols that require real-time processing and messaging.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A transaction processor receives requests to handle transactions involving the exchange of items between two parties. Transactions can occur on a large-scale, high-speed basis involving, for example, tens of thousands of transactions per second and millions of transactions per day; in some contexts, real-time messaging and responses are required according to structured transaction processing protocols.

The transaction processor often stores a record of these transactions. The records of transactions allow for auditability and recordkeeping in the event that confirmation of a transaction is needed, or a discrepancy is detected. In some cases, the transaction processor maintains a record of transactions on behalf of a particular entity in a transaction, such as a particular merchant or payment processor authorized by the merchant. The other entity can also maintain their own copy of the records of transactions. This entity can periodically perform operations to ensure that the set of records are complete and accurate. These operations can include evaluating the ledger for internal consistency or gaps in transactions. Confirming the validity of records of transactions can include checking that certain individual transactions are present or confirming that each transaction between a selected period of time is present in the records.

Confirming the validity of a set of records against a second set of records can use a process of searching through the full first set of records to identify either an individual requested transaction or searching through both the first set of records and the second set of records to determine whether each set of records includes the same set of records as the other. This process inefficiently uses computer processing time and energy as well as memory space. Inefficiencies can involve excess CPU cycles, use of computer memory, use of non-volatile digital storage, network bandwidth, and other computing resources. In particular, as the size of the set of records increases or the complexity of data stored within the records increases, the hardware and energy requirements increase. At the scale of commercial use, these inefficiencies inhibit the ability to deliver confirmation of verification of the two sets of records in a usable timeframe.

SUMMARY OF PARTICULAR EMBODIMENTS

The appended claims may serve as a summary of the invention.

DESCRIPTION OF EXAMPLE EMBODIMENTS

1. General Overview

Figure 1:
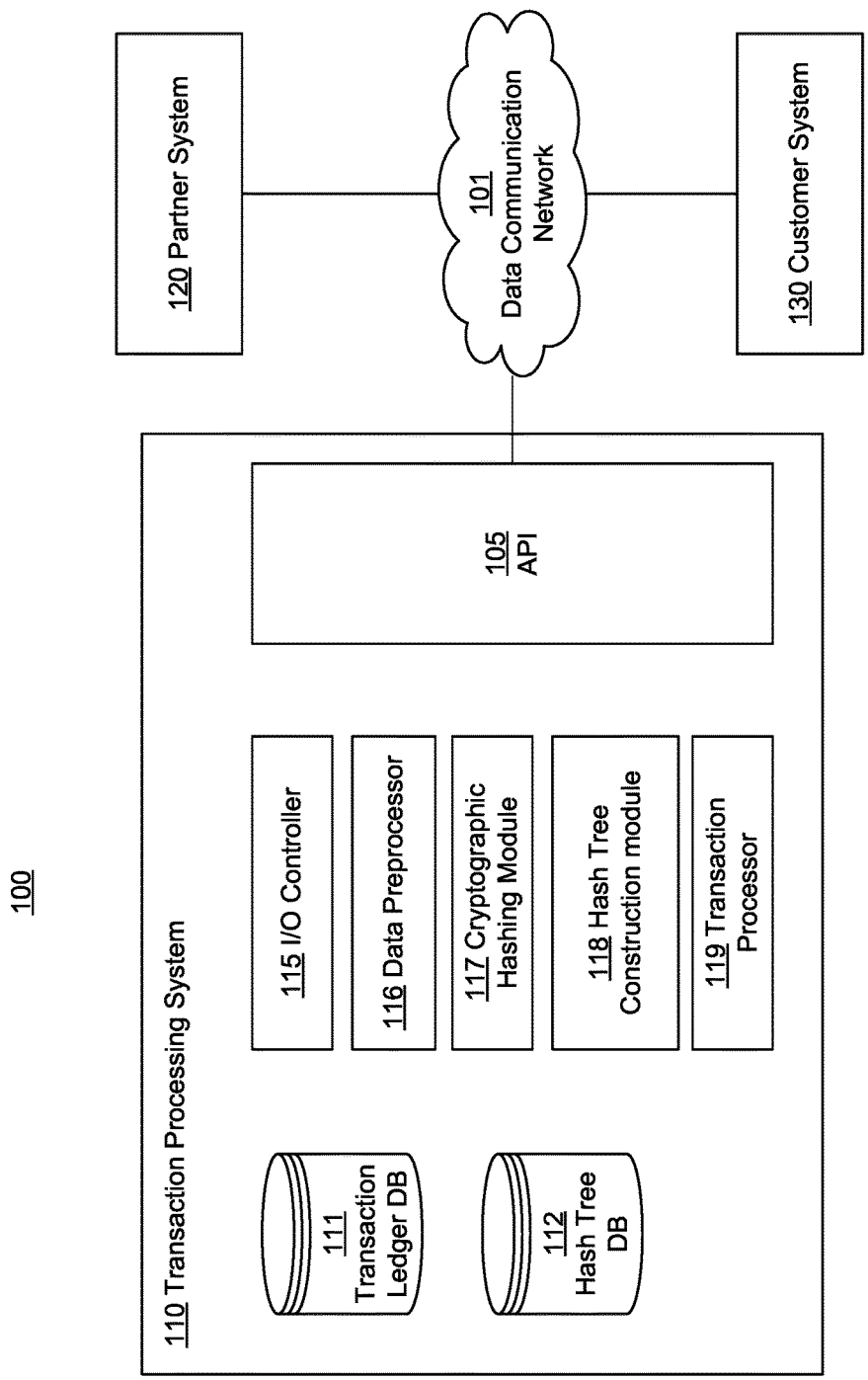
FIG. 1 illustrates an example distributed computer system including a transaction processing system.

In one or more embodiments, a transaction processor of a first computer is programmed to receive a request from a second computer via a data communication network to verify a first transaction ledger in comparison to a second transaction ledger. The request identifies the first transaction ledger and the second transaction ledger. Each of the first transaction ledger and the second transaction ledger are digitally stored in a networked online data storage device accessible to the transaction processor. The transaction processor is programmed to access the first transaction ledger and the second transaction ledger and convert the first transaction ledger and the second transaction ledger to a normalized data format. The transaction processor is programmed to execute one or more cryptographic one-way hash algorithms over the first transaction ledger and the second transaction ledger to create and store in memory a first hash tree for the first transaction ledger and a second hash tree for the second transaction ledger. The transaction processor is programmed to calculate a first verification value for the first hash tree and a second verification value for the second hash tree. The transaction processor is programmed to form and transmit to the second computer, via the data communication network, a response to the request based on a comparison of the first verification value and the second verification value. The response includes one or more of: a notification of inconsistency between the first transaction ledger and the second transaction ledger; and a notification of one or more identified discrepancies and one or more updates.

In one or more embodiments, the first hash tree includes one or more parent nodes each having one or more child nodes, the one or one child nodes for each parent node including at least one leaf node associated with one or more records from the transaction ledger. The transaction processor is further programmed to traverse the first hash tree and, for each leaf node, execute one or more cryptographic one-way hash algorithms to calculate a hash value based on the transaction records associated with the leaf node, and, for each parent node, execute one or more cryptographic one-way hash algorithms to calculate a hash value based on the hash values calculated for the one or more child nodes of the parent node. In one or more embodiments, the first verification value is a label for a root node of the first hash tree and the second verification value being a label for a root node of the second hash tree. In one or more embodiments, the comparison specifies a difference between the first verification value and the second verification value, and the response includes the notification of inconsistency between the first transaction ledger and the second transaction ledger.

In one or more embodiments, the transaction processor is further programmed to, responsive to the comparison specifying the difference between the first verification value and the second verification value, identify one or more discrepancies contained within one or more nodes of the first hash tree and one or more nodes of the second hash tree, update one or more records from the transaction ledger corresponding to the one or more nodes of the first hash tree or the one or more nodes of the second hash tree, and the response includes the notification of the one or more discrepancies and the one or more records that have been updated. In one or more embodiments, the transaction processor is further programmed to recursively select corresponding sub-trees from the first hash tree and the second hash tree, calculate verification values for the recursively constructed corresponding sub-trees, and compare the verification values for the recursively constructed sub-trees to identify at least one node that differs between the first hash tree and the second hash tree. In one or more embodiments, the comparison yields a match between the first verification value and the second value, and the response includes a confirmation of verification of the first transaction ledger and the second transaction ledger.

In one or more embodiments, each of the first transaction ledger and the second transaction ledger correspond to a specified period of time. In one or more embodiments, each of the first hash tree and the second hash tree include at least one node corresponding to a transaction ledger from a previous iteration of the specified period of time. In one or more embodiments, the normalized data format includes, for each transaction in the first transaction ledger or second transaction ledger: a transaction identifier, an account identifier, a date of the transaction, a value of the transaction, a data field. In one or more embodiments, the transaction processor is further programmed to order records of transactions within the first transaction ledger or second transaction ledger based on a value associated with each transaction. In one or more embodiments, the transaction processor is further programmed to receive the first transaction ledger with the request to verify the first transaction ledger; and retrieve the second transaction ledger from a secure transaction database. In one or more embodiments, each of the first transaction ledger or second transaction ledger is retrieved from a blockchain.

In one or more embodiments, a transaction processor of a first computer is programmed to receive a request from a second computer via a data communication network to verify a transaction record associated with a transaction ledger comprising a plurality of transaction records. The request includes an identifier for the transaction record. The transaction ledger is digitally stored in a networked online data storage device accessible to the transaction processor. The transaction processor is further programmed to access a hash tree constructed from the transaction ledger. The hash tree includes multiple nodes, including at least one leaf node associated with one or more transaction records of the multiple transaction records; and at least one parent node. Each parent node has one or more child nodes. A hash tree value for the leaf node is based on executing one or more cryptographic one-way hash algorithms over the one or more transaction records corresponding to the leaf node and a hash tree value for the parent node is based on executing one or more cryptographic one-way hash algorithms over the hash tree value for the one or more child nodes. The transaction processor is further programmed to execute one or more cryptographic one-way hash algorithms to calculate a hash value for the transaction record. The transaction processor is further programmed to traverse the hash tree based on the hash value to identify the transaction record in the transaction ledger. The transaction processor is further programmed to provide a response to the request, the response comprising a status of the transaction record in the transaction ledger.

In one or more embodiments, the transaction processor is further programmed to identify a first leaf node corresponding to the transaction record in the hash tree. The response includes a confirmation of the transaction record and one or more hash values in the hash tree to trace the existence of the first leaf node in the hash tree. In one or more embodiments, the transaction processor is further programmed to determine that a first leaf node corresponding to the transaction record does not exist in the hash tree. The response includes a notification that the transaction cannot be verified, and a record of hash searches performed. In one or more embodiments, the transaction processor is further configured to access the transaction ledger including the multiple transaction records from the networked online data storage device accessible to the transaction processor, execute one or more cryptographic one-way hash algorithms over the transaction ledger to calculate a hash value for each transaction record; generate the at least one leaf node for the hash tree based on at least one hash value, grouping two or more leaf nodes, execute one or more cryptographic one-way hash algorithms over at least the hash value for each of the two or more leaf nodes to calculate a hash value for a parent node of the two or more leaf nodes, and add the two or more leaf nodes and the parent node of the two or more leaf nodes to the hash tree. In one or more embodiments the hash tree value for the leaf node is a label for the leaf node and the hash tree value of the parent node being a label for the parent node. In one or more embodiments, the networked online data storage device accessible to the transaction processor being a blockchain.

Various embodiments are disclosed in the appended claims and can be directed to a method, a storage medium, a system and a computer program product; any feature recited in one claim category such as a method can be embodied in a claim in another category such as a system. The dependencies or references back in the appended claims are recited only for formal reasons. Any subject matter resulting from a reference back to any previous claims is within the scope of the disclosure, so that any combination of claims and the features thereof are disclosed and can be claimed regardless of the dependencies recited in the attached claims. The disclosure encompasses not only the combinations recited in the appended claims but also any other combination of features in the claims. Thus, the disclosure includes each feature recited in the claims in combination with any other feature or combination of other features in the claims. Furthermore, any of the embodiments and features described or depicted herein can be claimed in a separate claim and/or in any combination with any embodiment or feature described or depicted herein or with any of the features of the attached claims.

A transaction processor receives requests to handle transactions involving the exchange of physical or digital goods and funds between two parties. The transaction processor often stores a record of these transactions in a transaction ledger. The transaction ledger acts as a mechanism allowing for auditability and recordkeeping in the event that confirmation is needed, or a discrepancy is detected. In some cases, one of the parties is a partner or customer of the transaction processor, and therefore the transaction processor maintains a transaction ledger on behalf of that party in particular. Depending on the sophistication and size of the parties in the transaction, one or more of the parties can maintain their own copy of the transaction ledger. The partner who maintains their own transaction ledger can periodically perform operations to confirm the validity of their own transaction ledger. These operations can include evaluating the ledger for internal consistency or gaps in transactions. Additionally, the partner can involve third parties, such as the transaction processor, when confirming the validity of the transaction ledger.

The validity of a transaction ledger can refer to the assurance that all transactions processed by the transaction processor on behalf of the partner appear in the transaction ledger with appropriate accompanying data and timing information. Confirming validity can include checking that certain individual transactions are present or confirming that each transaction between a selected period of time is present in the transaction ledger. A transaction processing system can use one or more modules or processors to receive and manage requests to verify an individual transaction within a transaction ledger or to verify a first transaction ledger (for example, the transaction processor instance of the transaction ledger) or portion thereof against a second transaction ledger (for example, the partner instance of the transaction ledger).

In an embodiment, a transaction processing system can generate and use a Merkle tree, also known as a hash tree, which is digitally stored in memory or non-volatile storage, to store a representation of the transaction ledger in a compact format that enables efficient comparison of two transaction ledgers. As described in further detail below, generating a hash tree creates a root node with a hash value that is generated using one or more one-way cryptographic hashes. The hash value uniquely represents a state of the transaction ledger such that a difference in the appearance, order, status, or information associated with a single transaction record in the transaction ledger will cause a detectable difference in the hash value.

With this approach, validating a first transaction ledger against a second transaction ledger can comprise comparing the root node of hash tree representations of each of the first transaction ledger and the second transaction. If the hash values match, then the transaction ledgers can be cryptographically proven to be equivalent. If the hash values differ, then an inconsistency has been detected. To determine the source of the inconsistency, a sub-tree traversal procedure can be conducted through sub-trees constructed from the hash tree representations of the first transaction ledger and the second transaction ledger. The hash value for the root node of each corresponding sub-tree is compared. If the hash values match, then the sub-trees, and corresponding portions of the transaction ledger, are determined to be consistent. If the hash values do not match, then the process recursively continues until reaching a leaf node of the hash trees. As the leaf nodes represent individual transactions or collections of transactions, the source of the error can be readily determined.

In the ideal scenario, in which the transaction ledgers completely match, there is no longer a need to review and compare each transaction. Instead, only the hash value of the root nodes are exchanged and compared. This reduces the network bandwidth used in validating transaction ledgers in comparison to techniques in which the entire transaction ledger is exchanged and compared. Additionally, this reduces the use of computational resources, such as a CPU cycle and memory usage, by avoiding extraneous comparisons across transaction records when the transaction ledgers match. In the alternative, where discrepancies are to be identified and corrected, the recursive search through the sub-trees of the hash trees still reduces the number of individual comparisons that must be made based on the width of each level of the sub-tree. Because, as described herein, the recursive search and comparison of sub-trees selected from the two transaction ledgers efficiently targets the branches of the hash trees which contain inconsistencies, extraneous comparisons are reduced in the average case, further improving the efficiency of use of computational resources and network bandwidth. Moreover, because efficient hash values can be compared instead of the values of individual data records within the transaction records in the ledgers, the operation of the transaction processing system is made more efficient in even the worst case scenario by reducing the number of individual comparisons made without reducing efficacy of the comparison. Consequently, using the process of this disclosure, the operation of the transaction processing system in validating a first transaction ledger and a second transaction ledger is vastly improved in efficiency, speed, CPU, memory, and storage requirements. Real-time comparisons and responses in the context of a transaction processing protocol can be supported. Moreover, additional benefits result from the use of hash values to represent records in the transaction ledger for purposes of validating two transaction ledgers. In particular, data privacy protection is extended through the use of the systems described herein. As an example, where one-way cryptographic hashing algorithms are used, it is not possible to determine the plaintext corresponding to hash values exchanged between the transaction processing system and a partner system that has requested validation. This reduces the ability of another party to access sensitive data stored in the transaction records. Additionally, once the hash trees are constructed, neither the transaction processing system nor the partner system are required to have access to the underlying transaction ledger itself, further limiting dissemination and distribution of transaction data.

2. Structural Overview

FIG. 1 illustrates a distributed computer system 100 showing the context of use and principal functional elements with which one embodiment of the techniques described herein could be implemented.

In an embodiment, a distributed computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1, and the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology to the problem of efficient cryptographic verification of transaction ledgers. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

In an embodiment, distributed computer system 100 comprises a data communication network 101 that is communicatively coupled to a partner system 120, customer system 130, and, via an application programming interface ("API") 105, a transaction processing system 110. For purposes of illustrating a clear example, FIG. 1 shows one instance of each of the foregoing functional units, but in other embodiments, one or more of the functional units may be implemented with two or more units.

Each of the partner system 120, customer system 130, and transaction processing system 110 may be implemented using one or more server-class computers, clusters, virtual machines, or other computing devices. For example, transaction processing system 110 may be implemented using a fault-tolerant, scalable set of virtual computing instances in a private datacenter, public datacenter, or cloud computing facility with a number of central processing units sufficient to service thousands to millions of concurrent requests data communication network 101 via the API 105 and originating from thousands to millions of customer systems 130 or partner systems 120.

Partner system 120 may be owned or operated by, or associated with, a supplier of goods or services, such as a merchant, to an end user who is associated with customer system 130 or other entities or institutions. Partner system 120 may be a centralized or decentralized server operated by the merchant to track record keeping operations. Partner system 120 may also be an intermediate transaction processor between the merchant and the transaction processing system 110 such as a card issuer-processor, that owns, operates, or is associated with the transaction processing system 110. In other cases, partner system 120 may represent a point of sale terminal at which an individual end user appears in person to conduct a transaction.

In one embodiment, a customer system 130 is used and represents a mobile computing device, smartphone, laptop computer, desktop computer, or workstation that is associated with an individual end user. In some embodiments, customer system 130 is programmed with an operating system having an internet software stack that can communicate with data communication network 101 using protocols such as HTTP over TCP/IP, and has an internet browser that can communicate with partner system 120 to transfer requests and responses using HTTP, application protocols implemented using apps on the end user computer, or other techniques. The customer system 130 can be an individual end point for a merchant or terminal operator in embodiments in which the partner system 120 is a centralized entity partnering with the merchant. In particular embodiments, the customer system 130 can further issue requests to the transaction processing system 110 via the API 105, to perform similar operations as those described for the partner system 120.

Data communication network 101 broadly represents one or more local area networks, wide area networks, internetworks, or a combination thereof, which are communicatively coupled via any of wired or wireless, terrestrial or satellite network links. The data communication network 101 can further include one or more interconnected private networks for communication of sensitive information, such as payment protocol messages, transaction ledgers, records of payments, and other information which include customer identifiable information between the computers of authorized parties such as banks, payment clearinghouses, merchants, card issuers, and card processors.

Transaction processing system 110 may be one or more server computers and/or virtual machine instances that are programmed to implement the functions that are further described herein. In one embodiment, transaction processing system 110 is owned or operated by a card issuer-processor, transaction processor, acquirer, market regulator, banking entity, or other entity. The transaction processing system 110 may be architected with load balancing routers, multiple processors, clusters, or virtual machine instances, work queues, multithreaded programming, and parallel processing to operate with real-time response to requests from partner system 120 and customer system 130 via API 105 as they are conducting transactions at the scale of thousands to millions of requests per second. The transaction processing system 110 may be further architected to operate with efficient batch processing during off-peak hours.

In one embodiment, transaction processing system 110 comprises one or more digital storage devices, data stores, or databases, such as transaction ledger database 111 and hash tree database 112 that are programmed with a database schema or other form of organized, high-speed, digital storage. Databases 111, 112 may represent any digital data storage device or repository including combinations of database clusters, relational databases, object storage or other repositories. Transaction ledger database 111 may store one or more transaction ledger in a local or network-accessible storage for the transaction processing system 110 on behalf of one or more partner systems. The transaction ledger database 111 can be updated as transactions are processed through the transaction processing system. The hash tree database 112 may store one or more existing hash tree representations of transaction ledgers stored in the transaction ledger database 111. Although illustrated as being integral to the transaction processing system 110, each of the transaction ledger database 111 and hash tree database 112 or accessible portions thereof can be operated by external systems provided by third-party data storage providers. In particular embodiments, each of the transaction ledger database 111 and hash tree database 112 or accessible portions thereof can be or include a blockchain immutable ledger operated on a public, private, or semi-public basis in whole or in part by the transaction processing system 110, partner systems 120, or customer system 130.

The transaction processing system 110 further includes several processing modules, including the I/O controller 115, data preprocessor 116, cryptographic hashing module 117, hash tree construction module 118, and transaction processor 119, each of which can be implemented as one or more sequences of stored program instructions that are programmed to execute the functions that are described further in other sections. Although described as separated processing modules, each module can comprise one or more interconnected and shared centralized processing units or edge processors used in combination to operate software instructions provided via non-transitory computer-readable media to perform operations consistent with those described herein. For purposes of clarity, FIG. 1 illustrates one instance of the transaction ledger database 111, hash tree database 112, I/O controller 115, data preprocessor 116, cryptographic hashing module 117, hash tree construction module 118, and transaction processor 119. In practical embodiments, transaction processing system 110 may be architected with sufficient CPU power, memory, and storage to maintain multiple instances of each. For conciseness and to avoid obscuring the innovations of this disclosure, other components of a transaction processing system 110 not strictly germane to this disclosure and known to those of skill in the relevant technical fields are not illustrated.

The I/O controller 115 is generally configured to facilitate one or more users through partner system 120 or customer system 130 to interact with the transaction processing system 110. The I/O controller 115 is configured to receive requests from the API 105, dispatch work to the other modules and databases of the transaction processing system 110 to satisfy the request, and issue responses or replies to the requesting system via the API 105. The API 105 can be programmed to include endpoints accepting input parameters that are passed to the I/O controller 115 upon receipt. The API 105 therefore can restrict the functions of the transaction processing system 110 that are directly available to external systems (for example, partner system 120 or customer system 130). Example functions exposed by the API 105 include requests to verify a transaction ledger or portion thereof, verify the appearance or status of a selected transaction record or set of transaction records, requests to generate and receive a digitally stored hash tree corresponding to a selected or provided transaction ledger or portion thereof, requests to generate and receive a hash value corresponding to a transaction ledger or transaction record or set of transaction records, and other related requests to the operations of the transaction processing system 110 as described herein.

The data preprocessor 116 is generally configured to access a transaction ledger, for example, from the transaction ledger database 111 or passed to the transaction processing system 110 as part of a request via the API 105 and convert the transaction ledger to a normalized data format. Transaction ledgers can be organized in a variety of formats according to the preferences and requirements of the partner system 120 or customer system 130 for whom the transaction ledger is being maintained. As an example, partner systems 120 can specify varied or unique data formats to store transaction record data, such as transaction identifiers, dates and times, state of the corresponding transaction, etc. A cryptographic one-way hash algorithm used in generating a hash value can be sensitive to even minute differences in how data is stored or formatted prior to the execution of the cryptographic one-way hash algorithm such that the reordering of certain data can lead to widely varying output hash values.

Moreover, the inclusion of extraneous data in the transaction records stored into a hash tree corresponding to a transaction record can diminish the performance of the cryptographic one-way hash algorithm. Therefore, it may be desirable to preprocess transaction records before they are processed into a hash tree to ensure that necessary and sufficient data is included while extraneous data is excluded. Preprocessing the data can include selecting and reformatting data from the records of the transaction ledger to include minimally necessary data. In particular embodiments, the normalized data format can include, for each transaction record, a unique transaction identifier, a unique account identifier that is associated with the account of a partner, customer, or user, a date of the transaction, a time of the transaction, a value of the transaction, and a data field for the transaction. The data field can include a serialized data block and can be further represented as a string, BLOB, or other similar large string format. In particular embodiments, the normalized data format can be expanded to include a state of the corresponding transaction. Examples of state include pending, settled, and reversed; other states can be defined for different domains or embodiments.

The normalized data records can be assembled and ordered according to one or more of the pieces of data included in the normalized data format. For example, the converted data records can be ordered by unique transaction identifier or date and time of the transaction. Once converted and ordered, the transaction records can be stored in temporary storage before being treated to a cryptographic one-way hash algorithm and added to a hash tree.

The cryptographic hashing module 117 is programmed to execute one or more cryptographic one-way hash algorithms on selected values to generate hash values. The particular values and cryptographic one-way hash algorithms can vary depending on the context or stage of execution in the process of creating the hash tree. Typically hash algorithms with high collision resistance are used. The hash tree can include leaf nodes and parent nodes, which are digitally stored in main memory or in non-volatile storage with pointers, other references, or other links. Each leaf node can correspond to one or more transaction records from a transaction ledger. In creating the leaf nodes, the cryptographic hashing module 117 can execute a first cryptographic one-way hash algorithm on the values of the transaction record represented in the normalized data format.

In creating a first set of parent nodes, the cryptographic hashing module 117 can execute the first or a second cryptographic one-way hash algorithm on one or more leaf nodes that are to become child nodes of the parent node. In creating a second set of parent nodes, the cryptographic hashing module 117 can execute the first or second, or a third cryptographic one-way hashing algorithm on one or more parent nodes of the first set of parent nodes. Additionally, or alternatively, the values associated with one or more transaction ledger records can be added in with one or more nodes of the first set of parent nodes, for example, to create leaf nodes at different levels of the hash tree. As an example, and not by way of limitation, the cryptographic one-way hashing algorithms can include algorithms in the Secure Hash Algorithm family of algorithms, such as SHA-1, SHA-3 (for example, Keccak), SHA-224, SHA-256, SHA-384, SHA-512, SHA-512/224, SHA-512/256 or other variants, MD5, Skein, JH, BLAKE, bcrypt, LM hash, HKDF, or other similar cryptographic hashing algorithms.

The hash tree construction module 118 is generally configured to receive the hash values provided by the cryptographic hashing module 117 and construct the hash tree in a standardized and repeatable format to ensure that two identical transaction ledgers do not have differing hash tree representations due to the order of the construction of the hash tree. For example, the hash tree construction module 118 can combine leaf nodes in an order based on the ordering of the corresponding transaction records or using another immutable sequential process. As described, the hash tree construction module 118 associated one or more leaf nodes with a parent node, which itself is given a hash value. The parent node is then associated with its own parent node, which is parent to a sibling of the first parent node. This process continues until only a single root node remains which has a hash value that is representative of the entire hash tree and transaction record ledger. The hash value for the root node is also representative of the transaction ledger at a particular point in time because the addition of transaction records to the transaction ledger will affect the leaf nodes included in the hash tree and the hash tree itself.

Once the hash tree is completed, it can be stored by the hash tree construction module 118 in the hash tree database 112 with an identifier to associate the hash tree with the corresponding transaction ledger. As described herein, in particular embodiments, the hash tree is generated on-demand from a partner system 120 to request a comparison or verification of a transaction ledger stored by the partner system. In particular embodiments, the hash tree is generated periodically, such as during off-peak hours, as part of a batch process. For example, the hash tree can be generated nightly to represent the previous day's transactions or to represent a previous time period updated with the most recent transactions (for example, in a rolling update).

The transaction processor 119 is generally configured to handle transaction requests from the partner system 120 or customer system 130. These transaction requests will often result in the creation of transaction records, which are added to the transaction ledger associated with the partner system 120 or customer system 130 in the transaction ledger database 111. The transaction processor 119 can also control the operators of other modules of the transaction processing system 110 as a central processing unit or controller.

3. Transaction Ledger Verification Via Hash Tree

3.1 Overview of Example Hash Trees

Figure 2:
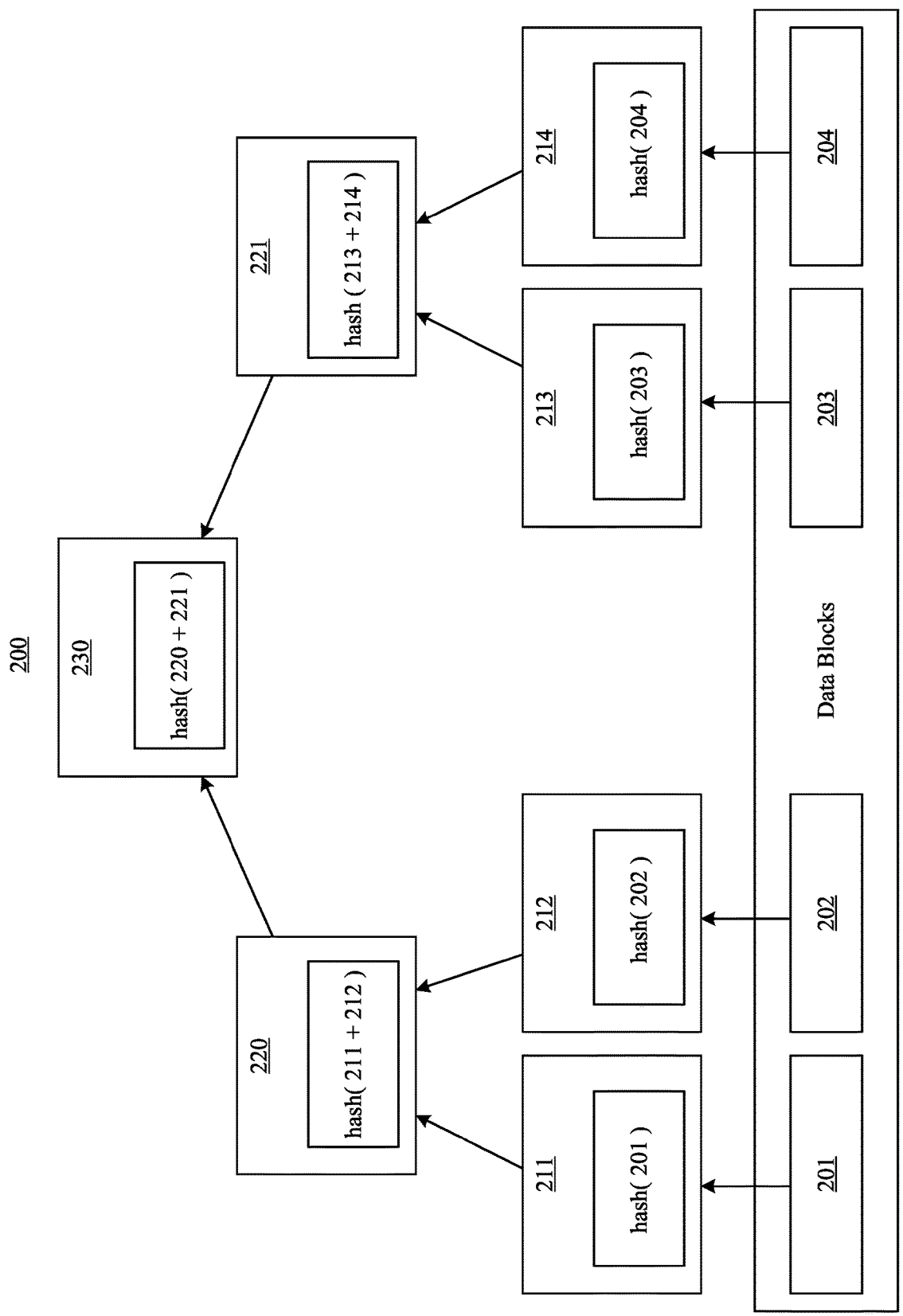
FIG. 2 illustrates an example hash tree.

FIG. 2 illustrates one example of a hash tree 200. A hash tree or Merkle tree is a tree in which every leaf node is labelled with the cryptographic hash or hash value of a data block, and every non-leaf or parent node is labelled with the cryptographic hash or hash value of the labels of its child nodes. A hash tree is therefore a tree of hashes in which the leaves include hashes of data blocks. The data blocks can include, for example, a set of files or a set of records in a transaction ledger. Nodes further up in the tree of hashes are the hashes of the children of the nodes. Hash trees allow efficient and secure verification of the contents of large data structures, such as transaction ledgers for active transaction processing systems and partner systems. In all embodiments, hash trees are digitally stored in main memory or non-volatile storage, for example, in the digital databases that have been described; thus, the hash trees are digital constructs that CPUs or other computational elements create, read, and use, and are not disclosed or claimed as mental constructs or paper-and-pencil elements.

Hash tree 200 is constructed based on four data blocks: data block 201, data block 202, data block 203, and data block 204. The first step of constructing the hash tree 200 is to calculate a cryptographic hash for each of the data blocks. As described herein, the cryptographic hash value can be calculated by executing a cryptographic hashing algorithm over each data block. A variety of secure or unsecured cryptographic hashing algorithms can be used depending on the sensitivity of the data stored in the data block as well as the reversibility of the hashing algorithm. In certain embodiments a one-way cryptographic hashing algorithm is used, while in other embodiments a reversible or two-way cryptographic hashing algorithm is used. The cryptographic hashing algorithm can be chosen based on speed and efficiency over the type of data included in the data blocks 201, 202, 203, and 204.

A leaf node of the hash tree is created corresponding to each data block. The leaf node is labeled based on the hash value calculated for each data block. The hash value for data block 201 is used to label leaf node 211, the hash value for data block 202 is used to label leaf node 212, the hash value for data block 203 is used to label leaf node 213, and the hash value for data block 204 is used to label leaf node 214.

Next, a parent node is generated to collect and be associated with one or more of the leaf nodes 211, 212, 213, and 214. In hash tree 200, two parent nodes 220 and 221 are created. Parent node 220 is associated with leaf node 211 and leaf node 212. Parent node 221 is associated with leaf node 213 and leaf node 214. Although hash tree 200 is a binary tree with two child nodes under each parent node, in other embodiments, many more child nodes can be associated with each parent node. Each parent node is then labeled with a hash value based on the labels of the child nodes. As an example, the label for parent node 220 is based on the cryptographic hashing algorithm executed over a concatenation of the labels for leaf node 211 and leaf node 212. The concatenation could comprise the hash value of data block 201 and data block 202. The label for parent node 221 is based on the cryptographic hashing algorithm executed over a concatenation of the labels for leaf node 213 and leaf node 214; the concatenation can comprise the hash value of data block 203 and data block 204 respectively. The labels for the leaf nodes can be combined in any suitable manner, including but not limited to concatenation, addition, XOR-ing, or expansion.

This process of combining child nodes under a parent node and labeling the parent node based on a hash value generated from the labels of the child nodes continues until only a single parent node remains. This parent node is the master node, top node, or root node. In hash tree 200, the root node 230 is the parent node of parent nodes 220 and 221. The label for the root node 230 is based on a hash value generated from the labels of parent node 220 and parent node 221. This final label is also known as the master hash, top hash, or root hash.

The root hash is a cryptographic hash value representation of the entire hash tree data structure. The root hash represents all data blocks in the original data, for example, all records in the transaction ledger upon which the hash tree is based. The root hash also serves as a proof of the data stored in the transaction ledger when compared against a hash generated in a similar fashion using a supposed copy of the transaction ledger. If the two root hashes match, then the transaction ledgers are provably identical. This verification can occur even without the transaction processing system 110 and a partner system 120, or two other functional elements, directly sharing the data represented in the hash tree. If the two root hashes differ, then the hash tree can be further used to identify discrepancies and recommend corrections to the transaction ledger or records contained therein.

3.2 Hash Tree Search and Traversal

Figure 3:
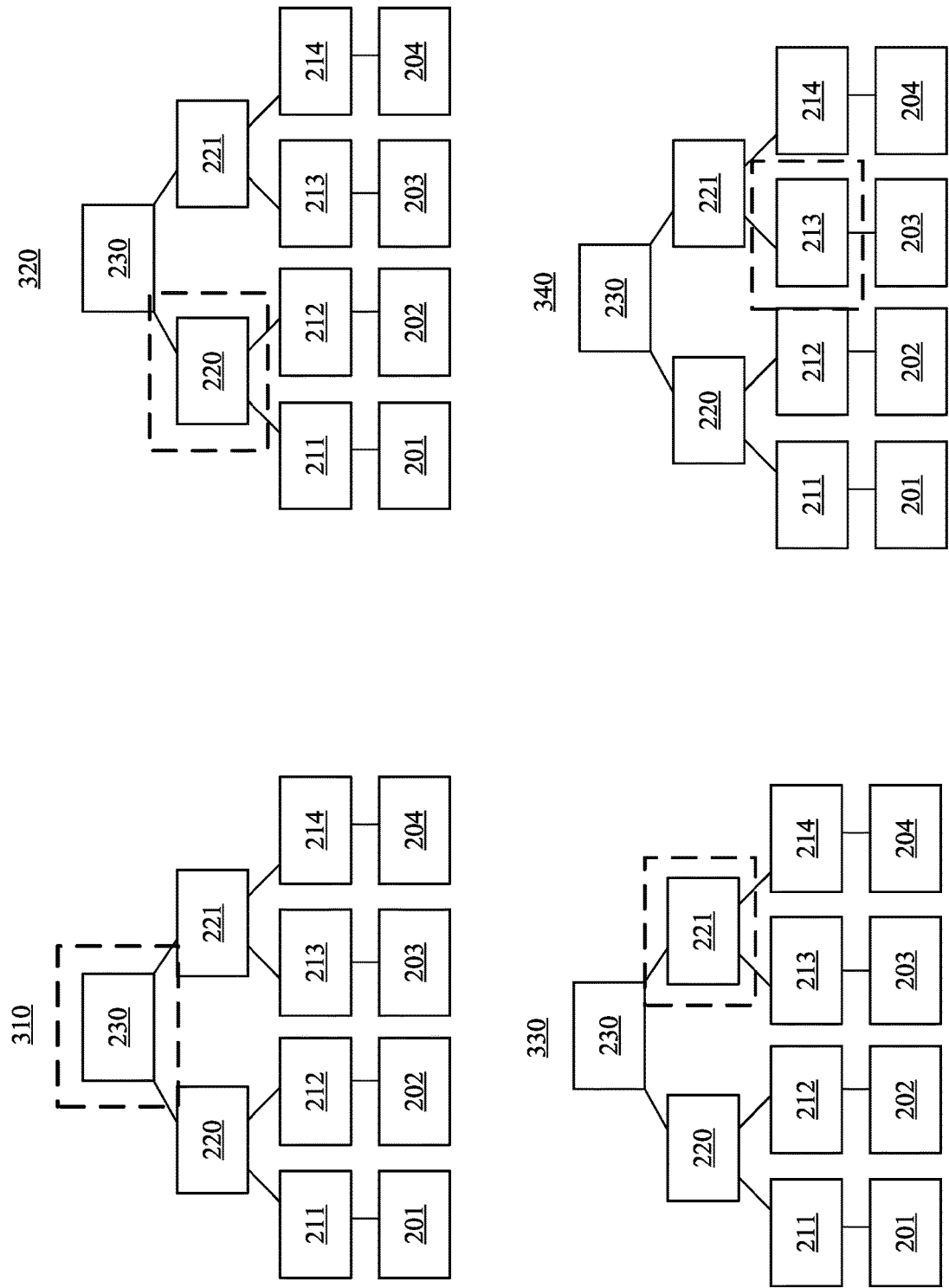
FIG. 3 illustrates an example hash tree traversal to verify the hash tree.

FIG. 3 illustrates an example process of searching a first hash tree to determine whether the first hash tree is consistent with a second hash tree and further determining the source of any discrepancies. In some embodiments, FIG. 3 can compare a first hash tree to a set of hash values rather than to a second hash tree.

For purposes of describing a clear example, this section presumes that the transaction processing system 110 has direct access to both the first hash tree and the second hash tree. In certain embodiments, the transaction processing system 110 may instead receive hash values on demand from the partner system 120 that is seeking to validate a locally stored instance of the hash tree that has been generated from a locally stored instance of a transaction ledger. Embodiments where the transaction processing system 110 has direct access to the second hash tree, can reduce latency introduced in the calculation by the requirements of transmitting hash values in a sequential order. This may be beneficial where it is already suspected that there is a high likelihood of a discrepancy. Embodiments where the transaction processing system 110 receives the hash values on demand reduce the initial transmission cost of sending the entire hash tree to request a simple validation. This may be beneficial where there is a low likelihood of a discrepancy between the first hash tree and the second hash tree.

At 310, the transaction processing system 110 compares the label of the root node 310, for example, the root hash, for the first hash tree, for example, generated from an instance of the transaction ledger retrieved from a transaction ledger database 111, and the label of the root node for the second hash tree received from the partner system 120. If the root hashes match, then the hash trees are equivalent. The transaction processing system 120 can notify the partner system 120 that the hash trees, and therefore the corresponding transaction ledgers are equivalent. The notification can comprise returning a result code in response to a function call or API call or creating and transmitting a response message within the context of a request-response transaction protocol; the particular programmatic means of notification is not critical. If the root hashes do not match, then the transaction processing system 120 descends a layer into the hash tree to begin to identify the discrepancy.

At 320, the transaction processing system 110 has begun a search of the hash tree 200. The transaction processing system 110 compares the label of a first child node 220 of the root node 230 in the first hash tree and the second hash tree. In this example, the transaction processing system 110 has determined that the two labels match. Therefore, the transaction processing system 110 can infer that the discrepancy will not be found in the left branch of the hash tree. The sub-tree of the hash tree 200 with node 220 as the root node does not need to be individually verified.

At 330, the transaction processing system 110 compares the label of a second child node 221 of the first hash tree and the second hash tree. In this example, the transaction processing system 110 determines that the two labels do not match. The transaction processing system 110 therefore infers that the discrepancy lies within the right branch of the hash trees. The transaction processing system 110 proceeds to attempt to validate the sub-tree of the hash tree with node 221 as the root node.

At 340, the transaction processing system 110 compares the labels of leaf node 213 in the first hash tree and the second hash tree. The transaction processing system 110 determines that the labels do not match. Since node 213 is a leaf node, and the label of the leaf nodes in the hash trees are based on the values within the transaction record corresponding to the leaf node, the transaction processing system 110 flags this nodes as a source of the discrepancy.

From step 340, the transaction processing system 110 can provide the hash value that is the label of the leaf node 213 or provide an identifier for the corresponding data block 203 to the partner system 120. The transaction processing system 110 and the partner system 120 coordinate to compare the values of the transaction record corresponding to data block 203 to rectify the discrepancy. In particular embodiments, the transaction processing system 110 can further compare the labels of the other children of the parent node 221 to confirm that the discrepancy only originated within the leaf node 213. Upon determining that the label of leaf node 214 in the first hash tree and the second hash tree match, the transaction processing system 110 can further confirm that leaf node 213 is the only source of a discrepancy. Note that several nodes (and corresponding data blocks) were not searched (for example, node 211 and 212), as the structure of the hash tree serves as proof of consistency between these nodes in the first hash tree and the second hash tree.

In particular embodiments, the transaction processing system 110 can receive or can be provided with a single hash value and a request to verify that the hash value is present within the hash tree. As an example, where the hash tree 200 corresponds to a transaction ledger, and each leaf node corresponds to a transaction record and has a label based on said transaction record, searching the hash tree 200 for a provided hash value can include determining that the transaction ledger contains the transaction record corresponding to the provided hash value. Because the hash value can be provided without necessarily providing the transaction record, the approach avoids exchanging potentially sensitive or identifiable data between systems. Therefore, the approaches herein can be used when a first system or program is seeking to determine that the record is present in a transaction ledger. Demonstrating that a leaf node with a provided label is a part of a given hash tree requires computing a number of hashes proportional to the logarithm of the number of leaf nodes of the tree, which is a lower search burden than searching the entire transaction ledger, which is proportional to the number of transaction records in the transaction ledger.

In response to the request to verify that the hash value is present within the hash tree, the transaction processing system 110 can provide a confirmation of the presence of the node labeled with the hash value. If the transaction record corresponding to the node is discernible, the transaction processing system 110 can provide a confirmation of the transaction record and one or more hash values in the hash tree to trace the existence of the node labeled with the hash value. This will allow the system that has requested the verification to confirm the same path through the hash tree to the same node. If the transaction processing system 110 is unable to confirm the existence of the hash value in the hash tree, the transaction processing system can provide a record of the hashes searched in the hash tree or other information to provide a proof of work performed in the attempt to verify the hash value.

In particular embodiments, the transaction processing system 110 can transition between modes through which it processes the hash tree. For example, the transaction processing system 110 can first receive the root hash of a hash tree from the partner system 120, for example, through the API 105. If the root hash of the hash tree generated by the transaction processing system 110 differs from the provided root hash, the transaction processing system 110 can notify the partner system 120 about the discrepancy, for example, through a return call on the API 105. In response, the partner system 120 can send the remaining values of the hash tree so that the transaction processing system 110 can identify the source of the discrepancy.

In particular embodiments, the functions to generate the hash tree corresponding to a transaction ledger are provided on-demand through the API 105. In other embodiments, transaction processing system 110 provides executable binaries or libraries comprising tools to generate the hash trees to the partner systems 120. Using these tools, the partner system 120 can generate its own local instance of the hash tree from a local instance of the transaction ledger. The partner system 120 can therefore perform the validation techniques described herein without sending financial information, personally identifiable information, or other sensitive information to the transaction processing system 110.

The provided tools can include tools consistent with the data preprocessor 116, cryptographic hashing module 117, and hash tree construction module 118.

In particular embodiments, a hash tree can be generated for a transaction ledger corresponding to a specified period of time. For example, the hash tree can be generated to cover transactions conducted over a preceding 24-hour period, 7-day period, or 30-day period. To represent preceding iterations of the specified period in subsequently generated hash trees, for example, to represent the previous 24-hour period of transactions, a node can be inserted into a subsequently generated hash tree. The label for this node can be generated from the hash tree corresponding to the preceding iteration of the period; for example, the label can be the root hash for the tree from this period. As an example, each of data block 201, 202 can correspond to transaction ledgers for a separate 24-hour period. The leaf nodes 211, 212 can be labeled with the root hash for the hash tree generated for the transaction ledgers. In this manner, the hash tree can efficiently store a record of many varying periods of time. Using the techniques described herein, a hash tree like hash tree 200 can include a mechanism to verify that the archival usage of the transaction ledger remains consistent while providing additional granularity for more recently conducted transactions which are more likely to contain errors or discrepancies. Verification, in this context, can include verifying the consistency of sub-trees composed of nodes corresponding to previously-generated hash trees.

4. Functional Overview

4.1 Constructing the Hash Tree

Figure 4:
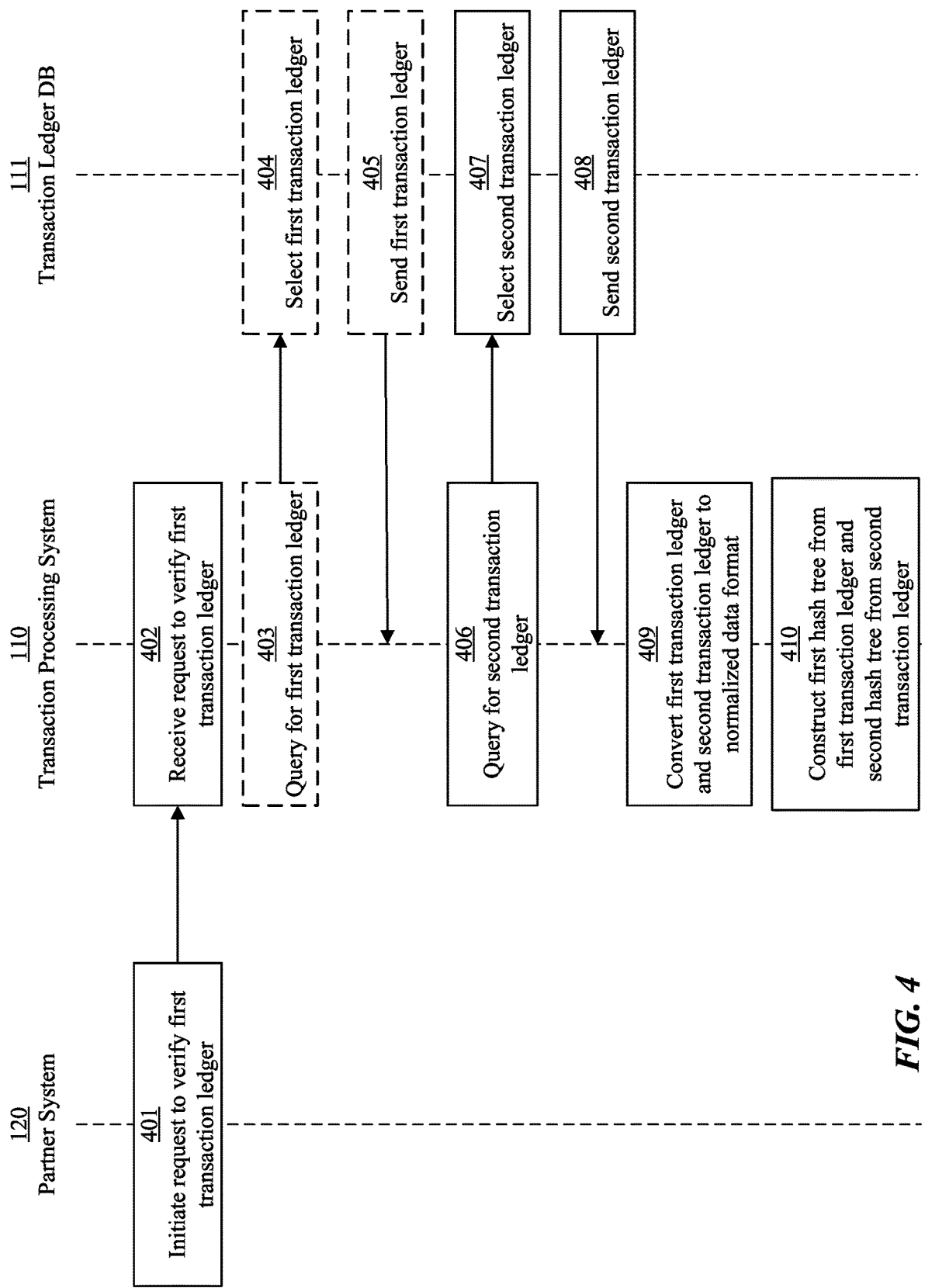
FIG. 4 illustrates an example process for generating hash trees based on a request to verify a transaction ledger.

FIG. 4 is an interaction diagram corresponding to one embodiment of a procedure that can be programmed to implement the techniques of this disclosure. In particular, FIG. 4 illustrates an algorithm for generating a hash tree, such as hash tree 200 shown in FIG. 2, that may be programmed for use in conjunction with the transaction processing system 110 and partner system 120 shown in FIG. 1.

In an embodiment, the process 400 shown in FIG. 4 begins at step 401 when a partner system 120 initiates a request to verify a first transaction ledger. For example, the request can be received via the API 105. In the illustrated example, the first transaction ledger is a local instance of the transaction ledger maintained by or on behalf of the partner system 120 and the second transaction ledger is an instance of the transaction ledger maintained by the transaction processing system. Verifying the first transaction ledger and the second transaction ledger therefore encompasses at least determining that the information contained within the first transaction ledger and the second transaction ledger match.

At step 402, the transaction processing system 110 receives the request to verify the first transaction ledger. For example, the request can be received via the API 105 over the data communication network 101. With the request, the transaction processing system 110 can receive data such as the identity of the partner system 120 or the entity that operates the partner system 120, an identifier or end point address for the first transaction ledger if the first transaction ledger is accessible to the transaction processing system, the first hash tree corresponding to the first transaction ledger or one or more hashes therein, and other information to facilitate the request to verify the first transaction ledger.

At step 403, the transaction processing system 110 may generate a query to retrieve the first transaction ledger. As described herein, in particular embodiments, the transaction processing system 110 may not receive or have access to the entirety of the first transaction ledger, such as where the partner system 120 provides a first hash tree or a sub-tree thereof with the request to verify the first transaction ledger, or where the partner system 120 provides the first transaction ledger itself with the request to verify the first transaction ledger. In such as case, steps 403-405 may be considered optional. As described herein, the transaction ledger database 111 can be in whole or in part a blockchain ledger accessible to the transaction processing system 110, so querying the transaction ledger database 111 for the first transaction ledger can include querying the blockchain ledger for relevant information.

At step 404, the transaction ledger database 111 receives the query for the first transaction ledger generated by the transaction processing system 110. The transaction ledger database 111 selects the first transaction ledger from the transaction ledger database 111 based on the query. For example, the ledger database 111 identifies the first transaction ledger from the ledger database 111 based on an identifier for the first transaction ledger or the partner system 120 provided by the transaction processing system. At step 405, the transaction ledger database 111 sends the first transaction ledger to the transaction processing system 110 or otherwise makes the first transaction ledger available to the transaction processing system.

At step 406, the transaction processing system 110 may generate a query to retrieve the second transaction ledger. In this example, the second transaction ledger is an instance of the transaction ledger maintained by the transaction processing system 120. Therefore, the transaction processing system 110 can query the transaction ledger database 111, as a secured network-accessible storage for the transaction processing system 110 to retrieve the second transaction ledger.

At step 407, the transaction ledger database 111 receives the query for the second transaction ledger generated by the transaction processing system 110. The transaction ledger database 111 selects the second transaction ledger from the transaction ledger database 111 based on the query. At step 408, the transaction ledger database 111 sends the second transaction ledger to the transaction processing system 110 or otherwise makes the second transaction ledger available to the transaction processing system for further processing.

At step 409, the transaction processing system 110 converts the first transaction ledger and the second transaction ledger to a normalized data format. As described herein, converting the first transaction ledger and the second transaction ledger to the normalized data format can be performed by a data preprocessor 116 of the transaction processing system 110. The normalized data format can be a simplified data format that comprises the minimally necessary information to verify the order and appearance of transaction records in the first transaction ledger and the second transaction ledger. In particular embodiments, the normalized data format can be one of several normalized data formats accessible to the data preprocessor 116. The choice of a selected normalized data format to use in response to the request to verify the first transaction ledger can be based on, for example, the preferences of the partner system 120, the data stored in the first transaction ledger, the identity of the partner system 120 or the entity operating the partner system, and other similar information. In embodiments in which the first transaction ledger is provided with or as a first hash tree, the transaction processing system 110 can convert only the second transaction ledger to the normalized data format.

At step 410, the transaction processing system 110 constructs a first hash tree from the first transaction ledger and constructs a second hash tree from the second transaction ledger using the techniques described herein. The transaction processing system 110 can construct each hash tree by executing a one-way cryptographic hashing algorithm over the transaction records of each transaction ledger to generate a set of hash values corresponding to the transaction records, generating leaf nodes for the hash tree, labeling each leaf node with one or more hash values, generating parent nodes for the hash tree associated with one or more leaf nodes, labeling each parent node with a hash value generated by executing a one-way cryptographic hashing algorithm over the labels of the leaf nodes of the parent node, and generating additional layers of parent nodes until a root node is generated by associating parent nodes from a layer with a new parent node and labeling the new parent node based on the labels of the associated parent nodes. In embodiments in which the first hash tree or one or more hash values corresponding thereto, like the root hash, are provided with the request to verify the first transaction ledger, then at step 410, the transaction processing system can construct only the second hash tree from the second transaction ledger.

4.2 Recursive Verification of a Hash Tree

Figure 5:
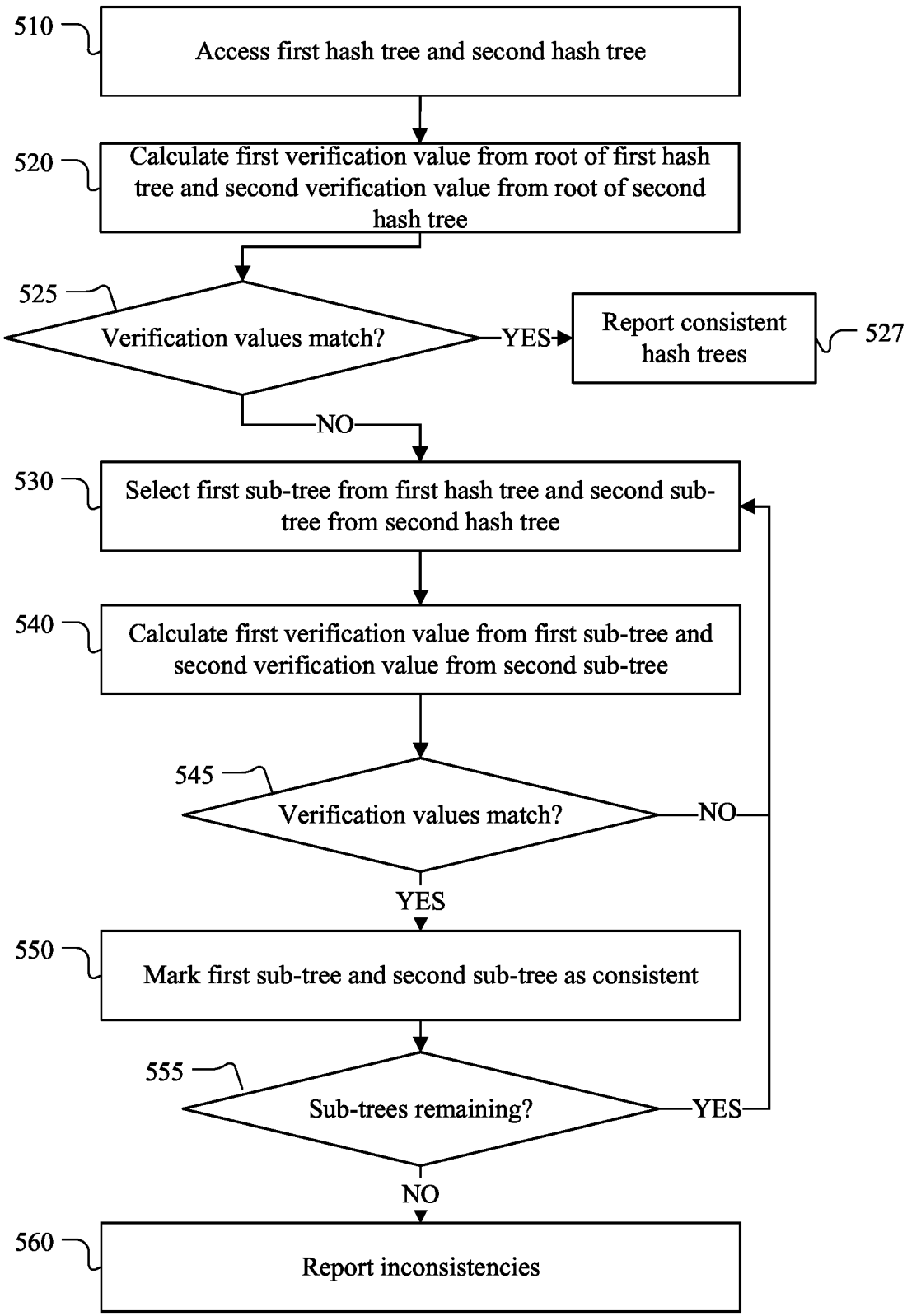
FIG. 5 illustrates an example process for validating a first hash tree and a second hash tree by recursively selecting sub-trees.

FIG. 5 is a flow diagram corresponding to one embodiment of an algorithm that can be programmed to implement the techniques of this disclosure. In particular, FIG. 5 illustrates an algorithm for recursively verifying the values of a first hash tree, such as hash tree 200 shown in FIG. 2, against a second hash tree that may be programmed for use in conjunction with the transaction processing system 110 and partner system 120 shown in FIG. 1.

In an embodiment, the process 500 shown in FIG. 5 begins at step 510 when the transaction processing system 110 accesses a first hash tree and a second hash tree. The first hash tree and the second hash tree can be retrieved, for example, from a hash tree database 112 as described in FIG. 1. The example of this section is described in the context of the transaction processing system 110 having direct access to both the first hash tree and the second hash tree. However, in some embodiments, the transaction processing system 110 may only have direct access to one of the hash trees. For example, there may be access only to the second hash tree being generated from an instance of a second transaction ledger maintained by the transaction processing system 110. In such embodiments, the transaction processing system 110 can query the partner system 120 or another functional element to retrieve or generate verification values from the first hash tree on demand.

At step 520, the transaction processing system 110 calculates a first verification value from the root node of the first hash tree and a second verification value from the root node of the second hash tree. Calculating the verification values can comprise retrieving the label applied to the root node during construction of the hash tree. In particular embodiments, calculating the verification value can further comprise applying one or more cryptographic, validation, or mathematical operations to the root node.

At step 525, the transaction processing system 110 determines whether the first verification value matches or is otherwise equivalent to the second verification value. If yes, the process 500 advances to step 527 and the transaction processing system 110 reports to the partner system 120 that has requested verification of the first hash tree and second hash tree that the first hash tree and the second hash tree are consistent. If the first verification value and second verification value do not match, the process advances to step 530.

At step 530, the transaction processing system 110 selects a first sub-tree from the first hash tree and a second sub-tree from the second hash tree. The transaction processing system 110 can select the sub-trees from the first hash tree and the second hash tree in a similar manner. For example, the system can be programmed for selecting a sub-tree based on a same branching operation, using an identical priority determination, or random process selection. In this way, the transaction processing system 110 can methodically determine the source of the inconsistency that has caused the first verification value and second verification value to not match.

At step 540, the transaction processing system 110 calculates a verification value from the first sub-tree of the first hash tree and calculates a verification value from the second sub-tree of the second hash tree. Like step 520, the verification values can be taken from or based on the labels of the root nodes of the first sub-tree and the second sub-tree.

At step 545, the transaction processing system 110 determines if a verification value calculated for the first sub-tree and a verification value calculated for the second sub-tree match. If the verification values do not match, then the process returns to step 530, where the transaction processing system 110 continues to traverse and generate deeper sub-trees for the first hash tree and second hash tree. If the transaction processing system 110 reaches a leaf node for which the verification values do not match, the transaction processing system 110 marks that leaf node as inconsistent.

If, at step 545 the transaction processing system 110 determines that the verification values do match, the process continues to step 550. At step 550, the transaction processing system 110 marks the first sub-tree from the first hash tree and the second sub-tree from the second hash tree as consistent. Because the verification values match, and the sub-trees are consistent, the transaction processing system 110 does not individually verify the consistency of other nodes in the first sub-tree and second sub-tree.

At step 555, the transaction processing system 110 is programmed to determine if there are other sub-trees remaining in the first hash tree and the second hash tree that have not yet been marked as consistent or marked as containing one or more inconsistent leaf nodes. If yes, the process returns to step 530, where the transaction processing system 110 selects one of the remaining sub-trees and repeats the process. If no, the process advances to step 560, at which the transaction processing system 110 is programmed to report the collected inconsistencies in the first hash tree and the second hash tree. In various embodiments, a report can comprise an API call response, return code, or message that specifies a list of leaf nodes that are inconsistent.

At step 560, in addition to reporting the inconsistencies in the hash trees, the transaction processing system 110 can access the transaction ledgers underlying the first hash tree and second hash tree and, based on information contained with the inconsistent leaf nodes, identify the transaction records that are inconsistent. In particular embodiments, the transaction processing system 110 can provide a notification to the partner system 120 that initiated the request to verify the first hash tree and second hash tree of the inconsistent transaction records. Additionally, or alternatively, the transaction processing system 110 can correct the inconsistencies by modifying the transaction ledger. The modification can involve determining a source of truth regarding the transaction and overwriting or replacing the transaction record that is inconsistent with the source of truth. The source of truth can be, for example, taken to be the second transaction ledger (as the second transaction ledger is maintained by the transaction processing system 110) or taken to be the ledger that has the most information regarding the transaction or the most up-to-date information. These modifications can also be reported or recommended to the partner system 120.

FIG. 4 and FIG. 5 and each other flow diagram herein is intended as an illustration at the functional level at which skilled persons, in the art to which this disclosure pertains, communicate with one another to describe and implement algorithms using programming. The flow diagrams are not intended to illustrate every instruction, method object or sub-step that would be needed to program every aspect of a working program, but are provided at the same functional level of illustration that is normally used at the high level of skill in this art to communicate the basis of developing working programs.

Although this disclosure describes and illustrates particular steps of the methods of FIG. 4 and FIG. 5 as occurring in a particular order, this disclosure contemplates any suitable steps of the methods of FIG. 4 and FIG. 5 occurring in any suitable order. Moreover, although this disclosure describes and illustrates example methods for constructing and verifying hash trees including the particular steps of the methods of FIG. 4 and FIG. 5, this disclosure contemplates any suitable method for constructing and verifying hash trees including any suitable steps, which may include all, some, or none of the steps of the methods of FIG. 4 and FIG. 5, where appropriate. Furthermore, although this disclosure describes and illustrates particular components, devices, or systems carrying out particular steps of the methods of FIG. 4 and FIG. 5, this disclosure contemplates any suitable combination of any suitable components, devices, or systems carrying out any suitable steps of the methods of FIG. 4 and FIG. 5.

5. Computer System Overview

Figure 6:
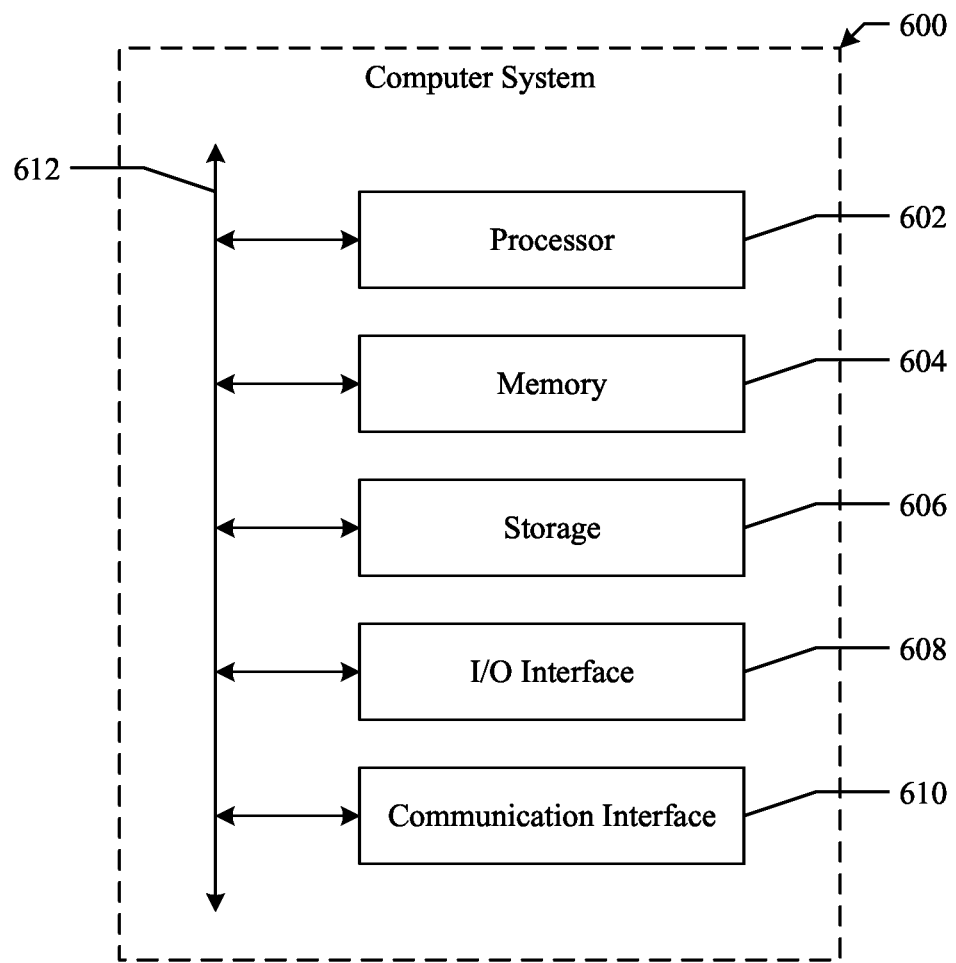
FIG. 6 illustrates an example computer system.

FIG. 6 illustrates an example computer system 600, which may be used to provide the transaction processing system 110, partner system 120, and customer system 130. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example, and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example, and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example, and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example, and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate access to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example, and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example, and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example, and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example, and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A computer-implemented method, comprising:
    using a transaction processor of a first computer, receiving a request from a second computer via a data communication network to verify a first transaction ledger in comparison to a second transaction ledger, the request identifying the first transaction ledger and the second transaction ledger, each of the first transaction ledger and the second transaction ledger being digitally stored in a networked online data storage device accessible to the transaction processor;
    using the transaction processor, accessing the first transaction ledger and the second transaction ledger and converting the first transaction ledger and the second transaction ledger to a normalized data format;
    using the transaction processor, executing one or more cryptographic one-way hash algorithms over the first transaction ledger and the second transaction ledger to create and store in memory a first hash tree for the first transaction ledger and a second hash tree for the second transaction ledger;
    using the transaction processor, recursively traversing corresponding nodes of the first hash tree and the second hash tree until a discrepancy is found between a first verification value for a current node of the first hash tree and a second verification value for a corresponding node of the second hash tree and recursively continuing traversal until reaching corresponding leaf nodes of the first hash tree and the second hash tree; and
    using the transaction processor, forming and transmitting to the second computer, via the data communication network, a response to the request based on a comparison of the first verification value and the second verification value, the response comprising one or more of: a notification of inconsistency between the first transaction ledger and the second transaction ledger; and a notification of records from the first transaction ledger and the second transaction ledger represented by the corresponding leaf nodes of the first hash tree and the second hash tree.

2. The computer-implemented method of claim 1, the first hash tree comprising one or more parent nodes each having one or more child nodes, the one or more child nodes for each parent node comprising at least one leaf node associated with one or more records from the first transaction ledger;
    the method further comprising traversing the first hash tree and:
        for each leaf node, executing one or more cryptographic one-way hash algorithms to calculate a hash value based on the one or more records from the first transaction ledger associated with the leaf node; and
        for each parent node, executing one or more cryptographic one-way hash algorithms to calculate a hash value based on the hash values calculated for the one or more child nodes of the parent node.

3. The computer-implemented method of claim 1, the first verification value being a label for a root node of the first hash tree and the second verification value being a label for a root node of the second hash tree.

4. The computer-implemented method of claim 1, the comparison specifying a difference between the first verification value and the second verification value, and the response comprising the notification of inconsistency between the first transaction ledger and the second transaction ledger.

5. The computer-implemented method of claim 4, further comprising
    updating one or more records from the second transaction ledger corresponding to the leaf node of the second hash tree,
    the response further comprising a notification that the one or more records of the second transaction ledger have been updated.

6. The computer-implemented method of claim 5, wherein
    recursively continuing traversal until reaching the corresponding leaf nodes occurs within corresponding sub-trees from the first hash tree and the second hash tree.

7. The computer-implemented method of claim 1, further comprising, in response to reaching corresponding leaf nodes of the first hash tree and the second hash tree, marking the corresponding leaf nodes as inconsistent.

8. The computer-implemented method of claim 1, each of the first transaction ledger and the second transaction ledger corresponding to a specified period of time.

9. The computer-implemented method of claim 8, each of the first hash tree and the second hash tree comprising at least one node corresponding to a transaction ledger from a previous iteration of the specified period of time.

10. The computer-implemented method of claim 1, the normalized data format comprising, for each transaction in the first transaction ledger or second transaction ledger: a transaction identifier, an account identifier, a date of the transaction, a value of the transaction, a data field.

11. The computer-implemented method of claim 1, further comprising ordering records of transactions within the first transaction ledger or the second transaction ledger based on a value associated with each transaction.

12. The computer-implemented method of claim 1, further comprising:
receiving the first transaction ledger with the request to verify the first transaction ledger; and
retrieving the second transaction ledger from a secure transaction database.

13. The computer-implemented method of claim 1, each of the first transaction ledger or the second transaction ledger being retrieved from a blockchain.

14. A transaction processing system comprising: one or more transaction processors; and one or more computer-readable non-transitory storage media coupled to one or more of the transaction processors and comprising instructions operable when executed by one or more of the transaction processors to cause the transaction processing system to perform operations comprising:
receiving a request from a computer system via a data communication network to verify a first transaction ledger in comparison to a second transaction ledger, the request identifying the first transaction ledger and the second transaction ledger, each of the first transaction ledger and the second transaction ledger being digitally stored in a networked online data storage device accessible to the one or more transaction processors;
accessing the first transaction ledger and the second transaction ledger and converting the first transaction ledger and the second transaction ledger to a normalized data format;
executing one or more cryptographic one-way hash algorithms over the first transaction ledger and the second transaction ledger to create and store in memory a first hash tree for the first transaction ledger and a second hash tree for the second transaction ledger;
recursively traversing corresponding nodes of the first hash tree and the second hash tree until a discrepancy is found between a first verification value for a current node of the first hash tree and a second verification value for a corresponding node of the second hash tree and recursively continuing traversal until reaching corresponding leaf nodes of the first hash tree and the second hash tree; and
forming and transmitting to the computer system via the data communication network, a response to the request based on a comparison of the first verification value and the second verification value, the response comprising one or more of: a notification of inconsistency between the first transaction ledger and the second transaction ledger; and a notification of records from the first transaction ledger and the second transaction ledger represented by the corresponding leaf nodes of the first hash tree and the second hash tree.

15. The transaction processing system of claim 14, the first hash tree comprising one or more parent nodes each having one or more child nodes, the one or more child nodes for each parent node comprising at least one leaf node associated with one or more records from the first transaction ledger, further comprising instructions operable when executed by one or more of the transaction processors to cause the transaction processing system to perform operations comprising:
traversing the first hash tree;
for each leaf node, executing one or more cryptographic one-way hash algorithms to calculate a hash value based on the one or more records from the first transaction ledger associated with the leaf node; and
for each parent node, executing one or more cryptographic one-way hash algorithms to calculate a hash value based on the hash values calculated for the one or more child nodes of the parent node.

16. The transaction processing system of claim 14, the first verification value being a label for a root node of the first hash tree and the second verification value being a label for a root node of the second hash tree.

17. The transaction processing system of claim 14, the comparison specifying a difference between the first verification value and the second verification value, and the response comprising the notification of inconsistency between the first transaction ledger and the second transaction ledger.

18. The transaction processing system of claim 17, further comprising instructions operable when executed by one or more of the transaction processors to cause the transaction processing system to perform operations comprising
updating one or more records from the second transaction ledger corresponding to the leaf node of the second hash tree,
the response further comprising a notification that the one or more records of the second transaction ledger have been updated.

19. The transaction processing system of claim 18, wherein
recursively continuing traversal until reaching the corresponding leaf nodes occurs within corresponding subtrees from the first hash tree and the second hash tree.

20. The transaction processing system of claim 14, wherein each of the first transaction ledger and the second transaction ledger correspond to a specified period of time, and wherein each of the first hash tree and the second hash tree comprise at least one node corresponding to a transaction ledger from a previous iteration of the specified period of time.

* * * * *